United States Patent

Häb-Umbach

[11] Patent Number: 5,937,382
[45] Date of Patent: Aug. 10, 1999

[54] METHOD OF DETERMINING REFERENCE VALUES

[75] Inventor: Reinhold Häb-Umbach, Aachen, Germany

[73] Assignee: U.S. Philips Corporation, New York, N.Y.

[21] Appl. No.: 08/642,015

[22] Filed: May 2, 1996

[30] Foreign Application Priority Data

May 5, 1995 [DE] Germany ............................ 195 16 106

[51] Int. Cl.$^6$ ....................................................... G10L 7/08
[52] U.S. Cl. ............................ 704/251; 704/252; 704/254
[58] Field of Search ................................. 395/2.6–2.66; 704/251–257

[56] References Cited

U.S. PATENT DOCUMENTS

| | | | |
|---|---|---|---|
| 4,813,074 | 3/1989 | Marcus | 381/36 |
| 5,226,085 | 7/1993 | Di Francesco | 381/51 |
| 5,228,110 | 7/1993 | Steinbiss | 395/2 |
| 5,278,942 | 1/1994 | Bahl et al. | 395/2 |
| 5,363,414 | 11/1994 | Muto | 375/94 |
| 5,377,301 | 12/1994 | Roseberg et al. | 395/2.31 |
| 5,497,447 | 3/1996 | Bahl et al. | 395/2.54 |
| 5,522,011 | 5/1996 | Epstein et al. | 395/2.31 |
| 5,613,034 | 3/1997 | Ney et al. | 395/2.6 |
| 5,617,486 | 4/1997 | Chow et al. | 395/2.65 |

*Primary Examiner*—David R. Hudspeth
*Assistant Examiner*—Michael N. Opsasnick

[57] ABSTRACT

Reference values are required for deriving word sequences from an unknown speech signal. These reference values are determined from a known test speech signal and represent multi-dimensional mean value vectors which are derived from the characteristic vectors formed during the processing of the test speech signal. As the processing of the test speech signal progresses mean value vectors are continuously split into two new mean value vectors, again. In order to minimize the total number of mean value vectors required for the description of the individual acoustic states of a speech signal, it is proposed to link individual mean value vectors, irrespective of whether or not they are associated with different acoustic states, provided that they neighbor one another closely enough. Notably if the steps of linking and splitting are performed a number of times, preferably in an alternating fashion, there is obtained a set of mean value vectors which approximate the acoustic states comparatively accurately. The mean value vectors, being associated with an acoustic state with each time the corresponding weight, constitute the reference value for the relevant acoustic state.

4 Claims, 1 Drawing Sheet

METHOD OF DETERMINING REFERENCE VALUES

The invention relates to a method of determining reference values which are required for deriving word sequences from a speech signal. The reference signals appear as multi-dimensional characteristic vectors, for example as an energy distribution across the frequency spectrum, and possibly further properties of the speech signal in a short time interval. From the speech signal to be processed there are derived test signals which also represent corresponding characteristic vectors which describe the speech signal for a short time interval. Each test signal is compared with at least a part of the reference signals in that the distances between the characteristic vectors are determined and therefrom scores are derived. The scores are accumulated so that ultimately at least one word sequence is determined on the basis of the most favorable accumulated score.

Each word to be determined is described by a defined sequence of acoustic states and at least one reference signal is associated with each acoustic state. The reference signals are formed from a predetermined, known test speech signal during a test phase. To this end, multi-dimensional characteristic vectors are also derived from the test signal at regular time intervals so as to be stored. As the processing of the test speech signal progresses, where clouds of characteristic vectors arise in the multi-dimensional acoustic space and for the description of these clouds, a mean value vector is determined from neighboring characteristic vectors. The mean value vector corresponds to the center of gravity of the relevant cloud. A reference signal is then determined by the mean value vector, together with the variance of the characteristic vectors or, in the event that several mean value vectors are assigned to one acoustic state, by the mean value vectors and their variance, as well as by weighting factors for the individual mean value vectors. For the sake of simplicity the variance is often assumed to be the same for all mean value vectors.

At the beginning of the formation of the mean value vectors, when the test speech signal has been processed, only a single mean value vector is available for each acoustic state; this vector is split into two mean value vectors during a subsequent processing step if given conditions are satisfied, for example if the number of characteristic vectors exceeds a predetermined value, said two mean value vectors preferably being assigned the same number of characteristic vectors. Methods serving this purpose are known. As the execution of said processing step progresses, new mean value vectors are formed continuously.

It often occurs that two newly formed mean value vectors are comparatively close neighbors. Ultimately, a number of mean value vectors will be determined which is larger than necessary or sensible for an attractive subdivision of the characteristic space. However, it may be that comparatively closely neighboring characteristic vectors belong to different acoustic states. In order to reduce the number of characteristic vectors, it is known for example from "Proc. Eurospeech" Berlin, September 1993, pp. 2203 to 2206, to select mean value vectors in such a manner that they can be assigned to a plurality of different states.

SUMMARY OF THE INVENTION

It is an object of the invention to provide a method of determining reference values for the processing of speech signals in which the number of mean value vectors required to form the reference signals is minimized.

To this end, pairs of two neighboring mean value vectors whose proximity satisfies predetermined conditions are linked in that they are replaced by a single, new mean value vector. This takes place independently of the assignment of mean value vectors to acoustic states. Such combining of two mean value vectors so as to form a single new mean value vector is performed, for example if the distance between these mean value vectors is below a predetermined value or if the number of mean value vectors exceeds a limit value. Other conditions may also be imposed. The linking of two mean value vectors by a single new mean value vector is then performed in direct succession for a plurality of mean value vectors. A criterion for the selection of the two mean value vectors to be linked may be, for example a least possible increase of a variance measure upon merging of these two mean value vectors. In this case still other conditions are also feasible.

Similar to the repeated splitting of mean value vectors so as to form two new mean value vectors as the processing of the characteristic vectors from the test speech signal progresses, the linking of mean value vectors can also be repeated, notably after the splitting of mean value vectors. The linking of pairs of two neighboring mean value vectors, however, is basically repeatedly possible at an arbitrary point in the processing of the test speech signal.

Upon linking of two mean value vectors it may occur that these two mean value vectors are associated with different states. Notably when a plurality of mean value vectors of different weight are assigned to one acoustic state, after the linking of mean value vectors their assignment to the acoustic states is preferably determined again. At least some of the mean value vectors are thus assigned to two or even more acoustic states with in general different weights. Ultimately this results in a very good description of the predetermined acoustic states by means of a minimum number of mean value vectors, so that the subsequent processing of a speech signal to be examined is faster as well as more reliable.

BRIEF DESCRIPTION OF THE DRAWING

Embodiments of the invention will be described in detail hereinafter with reference to the drawing. Therein.

DESCRIPTION OF THE PREFERRED EMBODIMENTS

Figure 1:
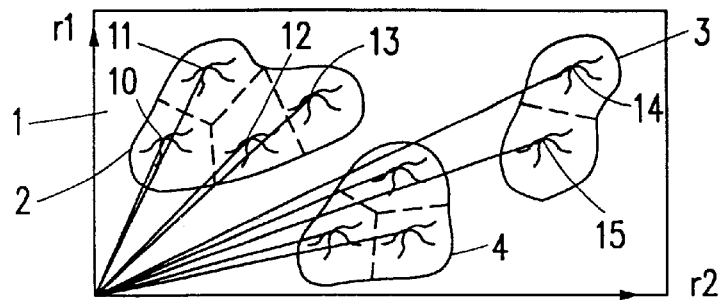
FIG. 1 shows a simplified two-dimensional characteristic space with mean value vectors.
Figure 2:
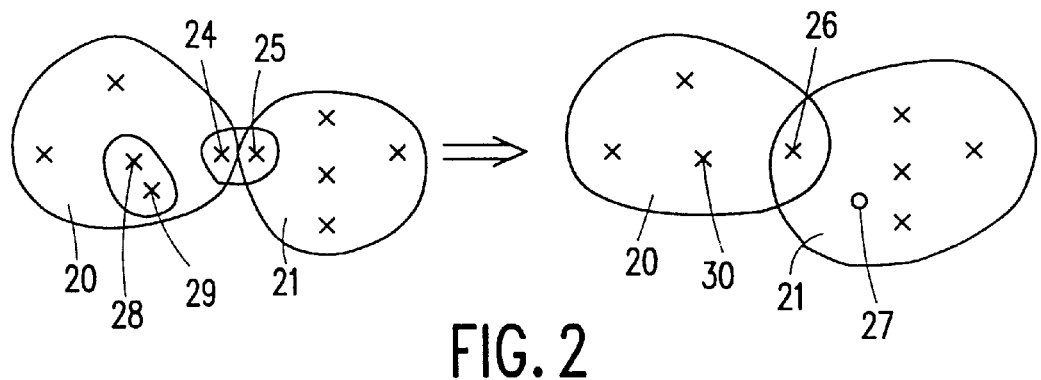
FIG. 2 shows diagrammatically the linking of two mean value vectors so as to form one new mean value victor.

FIG. 1 is a strongly simplified representation of a two-dimensional characteristic surface 1 with two components r1 and r2. Practical applications, however, are based on a more-dimensional characteristic space in which each characteristic vector has, for example 32 components, i.e. 32 classes of characteristics.

Figure 3A:
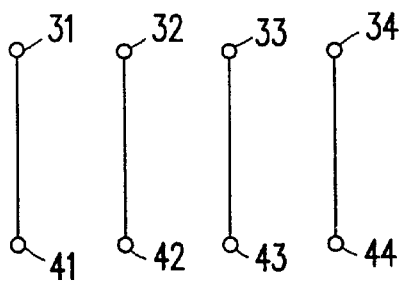
FIGS. 3a–3d shows the effects of two linking steps with an intermediate splitting step.
Figure 3B:
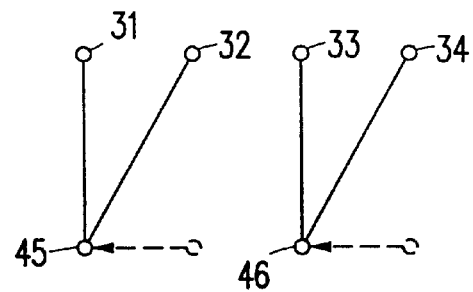

On the characteristic surface 1 of FIG. 1 three clouds 2, 3 and 4 of characteristic vectors are indicated. The characteristic vectors themselves are not shown and the clouds describe the ends of the characteristic vectors. In each cloud some mean value vectors are indicated, i.e. the mean value vectors 10 to 13 in the cloud 2 and the mean value vectors 14 and 15 in the cloud 3; in the vicinity of each mean value vector a two-dimensional frequency distribution or probability distribution is diagrammatically indicated. Customary distributions are Gauss distributions or Laplace distributions. Each mean value vector represents the center of gravity vector of the neighboring characteristic vectors (not shown) which are formed during processing of a test speech signal. Each cloud also represents an acoustic state, notably a fragment of a speech sound. It is formed in that whenever this speech sound occurs in the test speech signal, a corresponding characteristic vector occurs, the characteristic vectors together forming the corresponding cloud. Initially, when the characteristic vectors have been determined from the test speech signal, only few mean value vectors will be present at the center of gravity thereof. If the number of characteristic vectors for a mean value vector is larger than a predetermined value, the mean value vector is split into two new mean value vectors, for example as shown for the cloud 3 and the mean value vectors 14 and 15. In the cloud 2, however, two splits have already taken place, i.e. the original single mean value 41 and 42 into a new mean value vector 45; similarly, the mean value vectors 43 and 44 are combined into a new mean value vector 46 as indicated in FIG. 3b). The two states 31 and 32 then have the mean value vector 45 in common and, similarly, the states 33 and 34 have the mean value vector 46 in common.

Figure 3C:
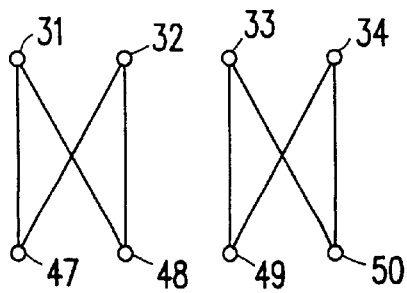

Subsequently a splitting step is performed during which the mean value vector 45 is split into two mean value vectors 47 and 48 as indicated in FIG. 3c) and, similarly, the mean value vector 46 is split into the two mean value vectors 49 and 50. It is to be noted that the new mean value vectors 47 to 50 deviate practically always from the original mean value vectors 41 to 44. The two mean value vectors 47 and 48 are now associated with the state 31, be it generally with different weights, and the mean value vectors 47 and 48 are associated with the state 32, also with different weights, so that in this state two different weights must be taken into account for each mean value vector. The same holds for the states 33 and 34 which have the two mean value vectors 49 and 50 in common with different weights. After this processing step there is a total of eight different weights.

Figure 3D:
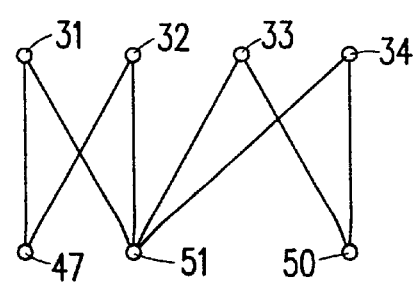

Subsequently, the execution of a combination step is assumed during which, however, only the two mean value vectors 48 and 49 are combined into a new mean value vector 51, whereas the mean value vectors 47 and 50 are assumed to remain the same as indicated in FIG. 3d). For the representation of the four states 31 to 34 only three mean value vectors 47, 50 and 51 now remain, two mean value vectors of generally different weight being involved in each state. These three mean value vectors require less storage space and can often describe the acoustic states 31 to 34 more accurately than the four mean value vectors 41 to 44 of FIG. 3a). Moreover, between the combination and splitting steps described with reference to the FIGS. 3b) to 3d) the processing of further parts of the test speech signal may take place; however, these steps can also be executed in direct succession.

What is claimed is:

1. A method of determining reference signals associated with acoustic states and generated from a test speech signal during a test phase, the method comprising the steps of:

a) deriving, at regular time intervals, multi-dimensional characteristic vectors from the test speech signal and storing the derived characteristic vectors, b) determining a mean value vector from neighboring characteristic vectors, each mean value vector representing the center of gravity of the neighboring characteristic vectors, c) splitting a mean value vector into two new mean value vectors whenever a threshold condition for splitting the mean value vector is satisfied, d) determining whether a threshold condition for linking mean value vectors is satisfied, the threshold condition for linking mean value vectors being a function of the set of all mean value vectors, e) where the threshold condition for linking is satisfied, linking pairs of arbitrary neighboring mean value vectors that satisfy threshold conditions of proximity, independent of an acoustic state associated with the mean value vectors, by replacing the pairs with a single new mean value vector, such linking performed in direct succession for pairs of mean value vectors satisfying the threshold conditions of proximity, and f) assigning mean value vectors to reference signals.

2. A method as claimed in claim 1, wherein the linking of the two arbitrary neighboring mean value vectors is performed repeatedly, notably each time after formation of two mean value vectors instead of a single mean value vector.

3. A method as claimed in claim 1, wherein;

more than one mean value vector is associated with at least a part of the acoustic states;

at least some mean value vectors are associated with two or more acoustic states; and after the linking of two neighboring mean value vectors, into a new mean value vector the assignment of the new mean value vector to the acoustic states is determined anew.

4. A method as claimed in claim 2, wherein:

more than one mean value vector is associated with at least a part of the acoustic states;

at least some mean value vectors are associated with two or more acoustic stages; and after the linking of two neighboring mean value vectors into a new mean value vector, the assignment thereof to the acoustic states is determined anew.

* * * * *